United States Patent Office 3,366,223
Patented Jan. 30, 1968

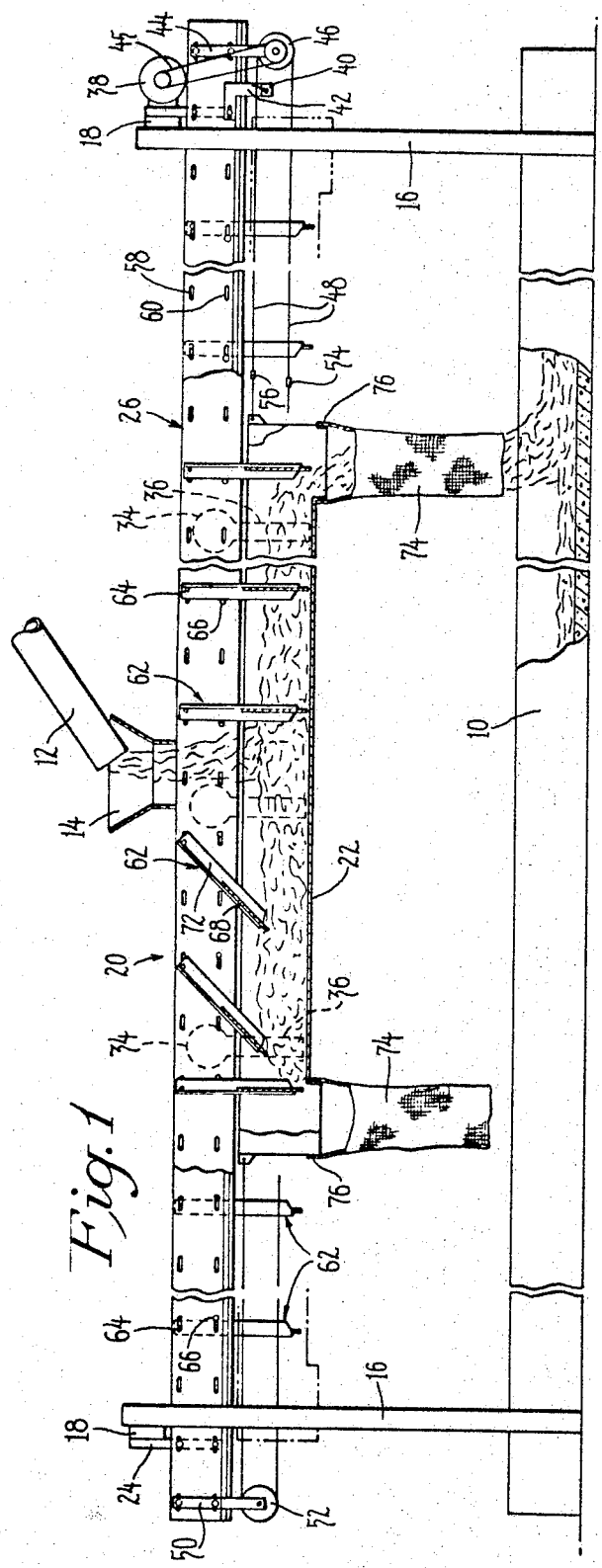
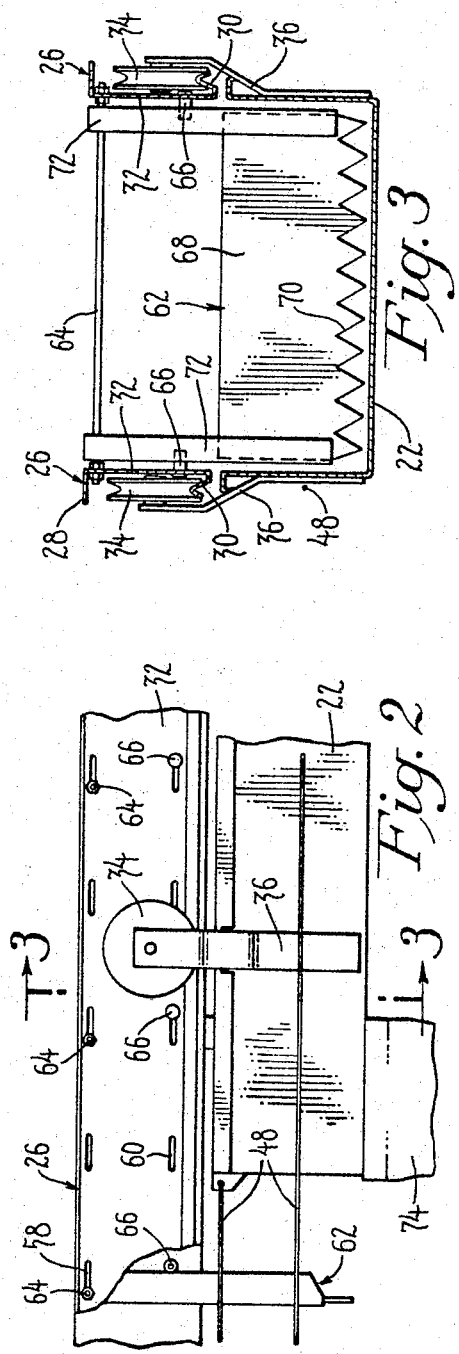
INVENTOR.
EUGENE P. HAEN
BY
Tweedale & Gerhardt
ATTORNEYS.

3,366,223
LIVESTOCK FEEDER WITH CHANNEL TRACK TO SUPPORT ENTIRE STRUCTURE
Eugene P. Haen, Kaukauna, Wis., assignor to Badger Northland, Inc., Kaukauna, Wis.
Filed Apr. 18, 1966, Ser. No. 543,133
2 Claims. (Cl. 198—67)

ABSTRACT OF THE DISCLOSURE

A livestock feeder having a horizontally reciprocating tray which receives feed from a central supply outlet and distributes it alternately off one end or the other to a feed trough below. Swinging divider members which alternately allow the feed in the tray to pass beneath them or to be held stationary until the open end of the tray slides out from under the feed are mounted upon the same rail members which form the track on which the tray reciprocates. The track is channel shaped and forms a spaced upward continuation of the side walls of the tray.

---

This invention relates to livestock feeders of the type which receives loose fodder from a conveyor or supply outlet and distributes it along the length of an animal feed trough or bunk. It has been proposed to provide a fodder distributing system in which an elongated tray is reciprocated back and forth beneath a stationary supply outlet to deposit a layer of fodder on the tray and to allow the layer to travel with the tray in a direction away from the supply outlet but to cause the layer of fodder to remain stationary as the tray travels in the opposite direction and thereby progressively dump the layer of fodder into a feed trough beneath as the tray slides out from under the stationary fodder. The present invention aims to provide an improved construction for livestock feeders of this type in which simple standardized parts may be utilized for building distributors of various lengths with a few simple and rugged pieces.

The invention comprises a pair of channel members which form a track for supporting a reciprocating trough mounted by means of rollers running in the track, the channel members being arranged to form continuations of the side walls of the feed carrier and serving also as supports on which swinging divider members may be readily mounted for swinging in either one direction or another as required.

FIGURE 1 is a side view of a livestock feeder illustrating a preferred form of the present invention;
FIGURE 2 is an enlarged fragmentary view corresponding to FIGURE 1; and
FIGURE 3 is a sectional view taken on line 3—3 of FIGURE 2.

There is shown in FIGURE 1 a feed trough or bunk 10 to which feed is to be distributed from a delivery spout 12. Conveniently, spout 12 leads from a conveyor system which in turn is fed by a silo unloader (not shown). A funnel 14 directs the continuously flowing feed or fodder, or other material, downwardly at a point substantially centrally of the feed bunk 10. Mounted on a suitable series of upright posts 16 and cross members 18 is a distributing mechanism generally designated 20, and comprising an elongated tray or trough 22, upon which fodder may be temporarily supported in preparation for distribution to the feed bunk below. Suspended from cross members 18 by means of metal straps 24 are a pair of channel shaped rail and frame members 26 each comprising a top flange 28 and V-shaped bottom flange 30 and a vertical connecting web 32. The lower flange forms a rail on which grooved rollers 34 may roll and from which the tray 22 is suspended by brackets 36.

Drive mechanism is provided for the tray 22, and may conveniently comprise a reversible electric motor 38 having a low speed output and controlled by a reversing switch 40 mounted on a bracket 42. Journaled on another bracket 44 and connected to be driven by a belt 45 from motor 38 is a capstan drum 46 around which is reeved a cable 48 having one end connected to the tray 22. At the opposite end of the feed bunk another bracket 50 supports a pulley 52, and the other end of the cable after passing around the pulley 52 is secured to the opposite end of the tray 22. The switch 40 has an upstanding arm which is forked and straddles the cable 48 so as to be actuated between forward and reverse positions by means of a pair of collars 54 and 56 securely fastened to cable 48 at appropriate points so as to assure reversing of the motor 38 as the tray 22 reaches either end of its normal range of travel.

The channel members 26 are provided with two series of holes 58 and 60 near the top and near the bottom of web 32 and equally spaced along the length of the channels. Preferably each of the holes is an elongated slot. The upper series of holes 58, or certain ones of them depending upon the spacing desired, are utilized as pivotal mountings for the swinging divider members 62, as more clearly shown in FIGURE 3. The pivotal mounting is preferably provided by a transverse rod 64 extending between the opposite track members 26. The lower series of holes 60 are utilized for mounting abutment pins 66 which serve to limit the angular displacement of dividers 62. Each divider 62 is preferably formed from a panel member 68 having a serrated saw-toothed lower edge 70. The panel 68 is securely fastened to upright vertical arms 72 of angle construction and which are pivotally suspended on pivot rods 64.

Those dividers which are located to the left of the central supply outlet are arranged with their pivot rods 64 positioned at the left end of slots 58, as shown in FIGURE 2. The abutment pins 66 for these dividers are positioned at the right-hand end of the slots 60. The length of the slots 58 and 60 in relation to the width of the support arms 72 is such that when a divider is hanging in a vertical position, or nearly so, the abutment pins 66 prevent counter-clockwise movement although clockwise movement is unhampered. On the right-hand half of the tracks 26 the divider pivot rods 64 and the abutment pins 66 are oppositely positioned with respect to the ends of slots 58 and 60 so that these dividers may swing freely in a counterclockwise direction but are blocked against clockwise motion from the vertical.

Suitable discharge chutes 74 are mounted at the ends of tray 22 by means of hollow square frames 76, and serve to conduct fodder falling from the end of tray 22 directly into the bunk 10 without possibility of wind interference. The chutes 74 may be formed of fabric or similar material.

In operation, with feed being delivered from delivery spout 12 and funnel 14, when the power switch (not shown) is closed to direct power to the motor 38, if the switch 40 is in the position shown in FIGURE 1 the tray 22 will be moving to the left, and fodder will be deposited in a layer as the tray travels underneath the delivery spout. As this layer abuts the end of each divider 62 it swings the divider clockwise and the divider rides lightly along the top of the fodder without disturbing the same to any significant degree.

When the tray 22 reaches the left limit of its travel the collar 54 shifts limit switch 40 and reverses the motor 38. By this time the tray 22 has been filled with fodder along its length and as the tray travels back toward the right all of the left-hand dividers 62 which lay in light contact with the top of the layer of feed are caused to engage and enter the layer with a sort of "pitch fork" action. As each divider reaches its vertical position its further swinging movement is blocked and the entire layer of fodder is thus prevented from traveling to the right with tray 22. Instead, the tray slides out from underneath the fodder and progressively drops it off from the left-hand end of the tray through the delivery chute 74 and distributes it in the left-hand half of the bunk 10. The distribution is substantially the same as the distribution was when the layer of feed was positioned on top of the tray.

At the same time, as the right-hand end of the tray travels along beyond the central point it receives feed from the delivery funnel and builds up a second layer upon the empty space which is created as the tray moves out from beneath the first layer. When the tray reaches the right-hand end of its stroke the motor reverses, and through a corresponding action of the dividers on the right, the second layer of feed is distributed in the right-hand half of feed bunk 10. This action is also illustrated in FIGURE 1 which shows the action which takes place on the second left-ward cycle after the mechanism is started up. In this manner tray 22 will continue to reciprocate along the rails 30 distributing successive layers of feed, first in one half and then in the other half of the feed bunk until the power supply to the motor is cut off.

The channel members 26 provide continuations in alignment with and above the side walls of tray 22 thus assuring that feed which is in the tray, and that which is falling from the supply spout 12, will fall cleanly into the trough without any horizontal surfaces on which fodder may pile up. In constructing fodder distributing devices of this type, the channel members may be supplied as continuous or jointed sections with standardized spacing between adjacent slots so that any number of dividers can be mounted at any desired spacing which is a multiple of the slot spacing. Likewise, these slots provide convenient mounting for the brackets 42, 44 and 50 and for the suspension straps 24.

We claim:

1. In a distributing device for animal fodder or similar material of the type having an open ended, elongated fodder tray mounted for horizontal reciprocation beneath a fodder supply outlet, a reversible drive mechanism for propelling the tray back and forth and a plurality of dividers mounted along the path of travel of the tray and arranged to allow the fodder in the tray to pass the dividers in one direction but to block movement of the fodder in the opposite direction, that improvement comprising a pair of longitudinal rails each having oppositely facing vertical webs in proximity to and in substantial alinement with the lateral edges of the tray and each having a track rail portion extending horizontally from the vertical web, means forming a series of divider supports distributed along the length of the web in spaced relation and comprising a first series of holes in the web, additional means forming a series of abutment supports correspondingly distributed and comprising a second series of holes positionally related to the first series and to the dividers in a manner to provide selective mounting of abutments for blocking the swing of their associated dividers either to the right or to the left.

2. The device of claim 1 wherein the two series of holes are in the form of longitudinal slots in vertical alinement with one another.

References Cited

UNITED STATES PATENTS

| | | | |
|---|---|---|---|
| 728,460 | 5/1903 | Hart | 198—67 X |
| 1,051,728 | 1/1913 | German | 212—71 X |
| 2,050,477 | 8/1936 | Weisselberg. | |
| 2,375,065 | 5/1945 | Askue | 198—202 |
| 2,279,837 | 4/1942 | Newlin | 198—223 |
| 2,891,659 | 6/1959 | Westeren | 198—221 |
| 2,936,082 | 5/1960 | Alimanestiano | 212—71 X |
| 3,062,405 | 11/1962 | Le Blanc | 198—154 X |

FOREIGN PATENTS 931,834 7/1963 Great Britain.

EVON C. BLUNK, *Primary Examiner.*

M. L. AJEMAN, *Assistant Examiner.*